US011888334B2

(12) United States Patent
Sergott et al.

(10) Patent No.: US 11,888,334 B2
(45) Date of Patent: Jan. 30, 2024

(54) METHODS AND SYSTEMS FOR CHARGING OR DISCHARGING ENERGY STORAGE SYSTEMS

(71) Applicant: Caterpillar Inc., Peoria, IL (US)

(72) Inventors: Kevin J. Sergott, Dunlap, IL (US); Dachuan Yu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 499 days.

(21) Appl. No.: 17/081,077

(22) Filed: Oct. 27, 2020

(65) Prior Publication Data

US 2022/0131388 A1    Apr. 28, 2022

(51) Int. Cl.
| | |
|---|---|
| *H02J 7/00* | (2006.01) |
| *H02J 3/06* | (2006.01) |
| *H02J 15/00* | (2006.01) |
| *H01M 10/44* | (2006.01) |
| *H02J 3/28* | (2006.01) |
| *H02J 13/00* | (2006.01) |
| *H02J 3/14* | (2006.01) |

(52) U.S. Cl.
CPC .............. *H02J 7/0013* (2013.01); *H02J 3/06* (2013.01); *H01M 10/441* (2013.01); *H02J 3/14* (2013.01); *H02J 3/28* (2013.01); *H02J 7/0068* (2013.01); *H02J 13/00004* (2020.01); *H02J 15/00* (2013.01); *H02J 2310/10* (2020.01); *H02J 2310/60* (2020.01); *Y02B 70/3225* (2013.01); *Y02P 80/14* (2015.11); *Y04S 20/222* (2013.01)

(58) Field of Classification Search
CPC .................................. H02J 7/0013; H02J 3/06
USPC .......................................................... 320/107
See application file for complete search history.

(56) References Cited

U.S. PATENT DOCUMENTS

| | | | | |
|---|---|---|---|---|
| 5,600,226 | A  * | 2/1997 | Falcon ................. | H02J 7/00711 320/156 |
| 5,926,008 | A  * | 7/1999 | Palanisamy ........ | G01R 31/3648 320/132 |
| 6,094,051 | A  * | 7/2000 | Palanisamy ...... | G01R 19/16542 324/426 |
| 6,757,590 | B2 * | 6/2004 | Ross ................. | H02J 13/00016 429/432 |
| 7,256,516 | B2 * | 8/2007 | Buchanan ............... | B60L 55/00 307/62 |
| 7,348,760 | B2 * | 3/2008 | Bucur ................... | H02J 7/0025 320/132 |

(Continued)

FOREIGN PATENT DOCUMENTS

| | | |
|---|---|---|
| CN | 107370171 A | 11/2017 |
| CN | 110336268 A | 10/2019 |
| EP | 2463981 A1 | 6/2012 |

OTHER PUBLICATIONS

European Search Report for Int'l. Patent Appln. No. 21200023.6-1202, dated Mar. 30, 2022 (7 pgs).

*Primary Examiner* — John T Trischler
(74) *Attorney, Agent, or Firm* — Bookoff McAndrews PLLC

(57) ABSTRACT

A method of allocating power across a microgrid having a plurality of energy storage systems with different power and/or energy capacities, and different states of charge. The method includes allocating a total charge request and/or a total discharge request across the energy storage systems; and limiting the charge and/or discharge of one or more energy storage systems to a submaximal value.

17 Claims, 8 Drawing Sheets

(56) References Cited

U.S. PATENT DOCUMENTS

| | | | | |
|---|---|---|---|---|
| 7,554,292 B2* | 6/2009 | Veselic | H02J 7/0013 | 320/124 |
| 7,791,314 B2* | 9/2010 | Bucur | H02J 7/0013 | 320/132 |
| 8,019,697 B2* | 9/2011 | Ozog | H02J 7/35 | 705/400 |
| 8,120,312 B2* | 2/2012 | Bucur | H02J 7/02 | 320/106 |
| 8,136,454 B2* | 3/2012 | Barbee | B61C 5/00 | 105/49 |
| 8,315,745 B2* | 11/2012 | Creed | H02J 3/28 | 700/297 |
| 8,342,103 B2* | 1/2013 | Barbee | B61C 3/02 | 320/135 |
| 8,364,609 B2* | 1/2013 | Ozog | G06Q 50/06 | 705/412 |
| 8,401,709 B2* | 3/2013 | Cherian | H02J 13/00017 | 700/291 |
| 8,436,579 B2* | 5/2013 | Veselic | H02J 7/0013 | 320/124 |
| 8,583,389 B2* | 11/2013 | Aoshima | B60L 50/61 | 702/63 |
| 8,626,348 B2* | 1/2014 | Owens | H02J 13/00024 | 700/297 |
| 8,640,629 B2* | 2/2014 | Barbee | B61C 3/02 | 105/35 |
| 8,643,330 B2* | 2/2014 | Nergaard | H02J 7/0013 | 320/109 |
| 8,738,194 B2* | 5/2014 | Creed | H02J 3/32 | 700/297 |
| 8,810,198 B2* | 8/2014 | Nergaard | B60L 53/63 | 320/109 |
| 8,825,218 B2* | 9/2014 | Cherian | H02J 13/00017 | 700/291 |
| 8,928,287 B2* | 1/2015 | Abe | H01M 10/486 | 702/65 |
| 8,928,288 B2* | 1/2015 | Abe | H01M 10/44 | 320/134 |
| 8,957,634 B2* | 2/2015 | Lo | H02J 7/0013 | 700/286 |
| 8,987,939 B2* | 3/2015 | Yu | H02J 3/381 | 307/64 |
| 9,002,761 B2* | 4/2015 | Montalvo | H02J 3/144 | 327/518 |
| 9,018,898 B2* | 4/2015 | Ziv | H02J 50/40 | 320/108 |
| 9,042,141 B2* | 5/2015 | Yu | H02J 3/241 | 363/95 |
| 9,077,198 B2 | 7/2015 | Szepesi | H02J 7/007184 | |
| 9,203,263 B2 | 12/2015 | Borras | H02J 9/00 | |
| 9,257,846 B2* | 2/2016 | Darcy | H02J 3/32 | |
| 9,367,108 B2 | 6/2016 | Asghari | H02J 7/0068 | |
| 9,368,973 B2 | 6/2016 | Creed | G05F 1/66 | |
| 9,415,699 B2 | 8/2016 | Morioka | H01M 10/482 | |
| 9,722,445 B2 | 8/2017 | Yu | H02J 1/00 | |
| 9,725,008 B2 | 8/2017 | Wu | B60L 50/61 | |
| 9,849,803 B2 | 12/2017 | Morioka | B60L 58/13 | |
| 9,871,396 B2 | 1/2018 | Hansen | H02J 7/35 | |
| 9,889,915 B2 | 2/2018 | Zhang | F02D 25/00 | |
| 10,114,398 B2 | 10/2018 | Creed | H02J 3/28 | |
| 10,139,846 B2 | 11/2018 | Motsenbocker | G05F 1/67 | |
| 10,146,242 B2* | 12/2018 | Steffen | G05B 19/0426 | |
| 10,224,739 B2 | 3/2019 | Kaag | H01M 10/441 | |
| 10,297,877 B2 | 5/2019 | Kagawa | H02J 7/0048 | |
| 10,353,420 B2 | 7/2019 | Creed | H02J 4/00 | |
| 10,439,429 B2 | 10/2019 | Ristau | H02J 3/38 | |
| 10,530,168 B2 | 1/2020 | Zhang | H02J 7/00712 | |
| 10,554,046 B2 | 2/2020 | de Hoog | H02J 13/00007 | |
| 10,590,860 B2 | 3/2020 | Moroto | F01D 15/10 | |
| 10,666,063 B2 | 5/2020 | Zhang | H01M 10/4257 | |
| 10,700,521 B2 | 6/2020 | Shim | H02J 3/00 | |
| 10,807,495 B2* | 10/2020 | Akashi | H02J 3/322 | |
| 10,848,098 B2* | 11/2020 | Agarwal | H01M 10/441 | |
| 10,998,732 B2* | 5/2021 | Reddy | H02K 7/1815 | |
| 11,133,677 B2 | 9/2021 | Tabuchi | H02J 7/34 | |
| 11,177,664 B2* | 11/2021 | Converse | H02J 3/381 | |
| 11,188,045 B2 | 11/2021 | Reddy | H02J 3/46 | |
| 11,336,111 B2 | 5/2022 | Beaston | H02J 3/32 | |
| 11,522,387 B2 | 12/2022 | de Hoog | H02J 3/381 | |
| 2002/0169523 A1* | 11/2002 | Ross | H02J 3/381 | 700/286 |
| 2004/0130292 A1* | 7/2004 | Buchanan | B60L 53/20 | 320/116 |
| 2004/0178766 A1* | 9/2004 | Bucur | H02J 7/0018 | 320/112 |
| 2005/0156431 A1* | 7/2005 | Hennessy | H01M 8/188 | 290/44 |
| 2008/0007218 A1* | 1/2008 | Veselic | H02J 7/0013 | 320/116 |
| 2008/0231117 A1* | 9/2008 | Bucur | H02J 5/00 | 320/137 |
| 2009/0140576 A1* | 6/2009 | Yu | H02J 3/28 | 307/66 |
| 2009/0230920 A1* | 9/2009 | Veselic | H02J 7/0013 | 320/116 |
| 2010/0179704 A1* | 7/2010 | Ozog | H02J 7/35 | 703/2 |
| 2010/0274407 A1* | 10/2010 | Creed | H02J 3/32 | 700/295 |
| 2010/0275810 A1* | 11/2010 | Barbee | B61C 5/00 | 320/136 |
| 2010/0327813 A1* | 12/2010 | Bucur | H02J 5/00 | 320/134 |
| 2011/0035073 A1* | 2/2011 | Ozog | G06Q 10/06315 | 700/291 |
| 2011/0106321 A1* | 5/2011 | Cherian | H02J 13/00034 | 700/286 |
| 2012/0065805 A1* | 3/2012 | Montalvo | H02J 3/144 | 700/297 |
| 2012/0133333 A1* | 5/2012 | Morioka | H02J 7/0049 | 320/134 |
| 2012/0146585 A1* | 6/2012 | Darcy | H02J 3/32 | 320/128 |
| 2012/0160124 A1* | 6/2012 | Barbee | B61C 5/00 | 105/35 |
| 2012/0169291 A1* | 7/2012 | Abe | H02J 7/0018 | 320/134 |
| 2012/0173033 A1* | 7/2012 | Tischer | H02J 7/0013 | 700/295 |
| 2012/0176091 A1* | 7/2012 | Abe | H02J 7/0029 | 320/132 |
| 2012/0235646 A1* | 9/2012 | Lo | H02J 7/0013 | 320/137 |
| 2012/0249085 A1* | 10/2012 | Lin | H02J 7/0071 | 320/162 |
| 2012/0296484 A1* | 11/2012 | Owens | H02J 13/00026 | 700/295 |
| 2012/0319491 A1* | 12/2012 | Borras | H02J 9/00 | 307/80 |
| 2013/0002027 A1* | 1/2013 | Yu | H02J 9/061 | 307/64 |
| 2013/0057067 A1* | 3/2013 | Creed | H02J 3/28 | 307/19 |
| 2013/0057209 A1* | 3/2013 | Nergaard | B60L 1/003 | 320/109 |
| 2013/0057210 A1* | 3/2013 | Nergaard | B60L 53/11 | 320/109 |
| 2013/0166085 A1* | 6/2013 | Cherian | G05F 1/66 | 700/291 |
| 2013/0167752 A1* | 7/2013 | Barbee | B61C 5/00 | 105/1.4 |
| 2013/0207599 A1* | 8/2013 | Ziv | H02J 50/80 | 320/108 |
| 2014/0005852 A1* | 1/2014 | Asghari | G06F 1/26 | 700/297 |
| 2014/0175881 A1* | 6/2014 | Creed | H02J 4/00 | 307/29 |
| 2014/0184173 A1* | 7/2014 | Szepesi | H02J 7/0068 | 320/164 |

(56) References Cited

U.S. PATENT DOCUMENTS

| | | | |
|---|---|---|---|
| 2014/0218985 A1* | 8/2014 | Yu | H02M 7/537 363/97 |
| 2014/0350743 A1* | 11/2014 | Asghari | G05B 13/048 700/297 |
| 2015/0012146 A1* | 1/2015 | Cherian | H02J 13/00034 700/291 |
| 2015/0097437 A1* | 4/2015 | Votoupal | H02J 3/48 307/84 |
| 2015/0314701 A1* | 11/2015 | Morioka | H02J 7/0049 320/134 |
| 2016/0141879 A1* | 5/2016 | Motsenbocker | G05F 1/67 307/130 |
| 2016/0156220 A1* | 6/2016 | Kaag | H02S 40/38 307/20 |
| 2016/0190822 A1* | 6/2016 | Lee | H02J 3/003 307/24 |
| 2016/0266595 A1* | 9/2016 | Creed | G05B 15/02 |
| 2016/0377306 A1* | 12/2016 | Drees | H02J 3/28 700/295 |
| 2017/0063124 A1* | 3/2017 | Yu | H02J 7/345 |
| 2017/0267118 A1* | 9/2017 | Akashi | H02J 7/0068 |
| 2017/0285111 A1* | 10/2017 | Fife | G01R 31/367 |
| 2017/0329361 A1* | 11/2017 | Burlinson | H02J 3/32 |
| 2017/0331325 A1* | 11/2017 | Ristau | H02J 3/38 |
| 2017/0366014 A1* | 12/2017 | Hansen | H02J 3/32 |
| 2017/0373355 A1* | 12/2017 | Kagawa | H02J 7/0048 |
| 2018/0001985 A1* | 1/2018 | Zhang | F02D 29/02 |
| 2018/0059700 A1* | 3/2018 | Steffen | H02J 3/381 |
| 2018/0167028 A1* | 6/2018 | Agarwal | H02S 40/38 |
| 2018/0205250 A1* | 7/2018 | Zhang | H01M 10/44 |
| 2018/0267597 A1* | 9/2018 | Allen-Ware | G06F 1/266 |
| 2018/0298830 A1* | 10/2018 | Moroto | F01D 15/10 |
| 2018/0316187 A1* | 11/2018 | Shim | G06Q 10/0631 |
| 2019/0064864 A1* | 2/2019 | Creed | G05B 15/02 |
| 2019/0190269 A1* | 6/2019 | de Hoog | H02J 13/00017 |
| 2019/0296570 A1* | 9/2019 | Zhang | H02J 7/00712 |
| 2020/0067316 A1* | 2/2020 | de Hoog | G06Q 50/06 |
| 2020/0301383 A1* | 9/2020 | Reddy | H02J 3/381 |
| 2020/0303925 A1* | 9/2020 | Reddy | G05F 1/66 |
| 2020/0373760 A1* | 11/2020 | Tabuchi | H02J 3/32 |
| 2021/0083505 A1* | 3/2021 | Beaston | H02J 3/381 |
| 2021/0135459 A1* | 5/2021 | Converse | H02J 3/12 |
| 2021/0359521 A1* | 11/2021 | Gayles | H02J 3/14 |
| 2022/0014025 A1* | 1/2022 | Brombach | H02J 3/004 |
| 2022/0131381 A1* | 4/2022 | Sergott | H02J 3/48 |
| 2022/0147004 A1* | 5/2022 | Meurant | H02J 13/00004 |
| 2022/0360105 A1* | 11/2022 | Beaston | H02J 9/06 |

* cited by examiner

US 11,888,334 B2

METHODS AND SYSTEMS FOR CHARGING OR DISCHARGING ENERGY STORAGE SYSTEMS

TECHNICAL FIELD

The present disclosure relates generally to energy storage systems, and more particularly, to methods and systems for charging and/or discharging energy storage systems.

BACKGROUND

The present disclosure relates to the control of microgrids that send and receive power. Microgrids may include a plurality of different energy storage systems, such as different battery systems, fuel cells, etc. The different energy storage systems may have different power and energy capacities, and may be at different states of charge. With such varied characteristics between the energy storage systems, charging and discharging the systems in a balanced manner can be difficult. Unbalanced distribution of charge or discharge can affect the health or life of one or more of the energy storage systems, and thus negatively affect the microgrid.

U.S. Pat. No. 9,257,846 ("the '846 patent) discloses a method for responding to a change in electric power demand. The method includes (1) charging an energy storage subsystem from an electric power grid, (2) discharging the energy storage subsystem into the electric power grid at a discharge rate that is less than a maximum rate of discharge of the energy storage subsystem, and (3) adjusting the discharge rate in response to a signal selected from the group consisting of a signal to provide a regulation up service and a signal to provide a regulation down service. While the system and methods of the '846 patent discuss adjusting a discharge rate, the patent relates to changes in demand and does not deal with a plurality of different energy storage systems.

The systems and method of the present disclosure may solve one or more of the problems set forth above and/or other problems in the art. The scope of the current disclosure, however, is defined by the attached claims, and not by the ability to solve any specific problem.

SUMMARY

The present disclosure provides for a method of allocating power across a microgrid having a plurality of energy storage systems with different power and/or energy capacities, and different states of charge. The method includes allocating a total charge request and/or a total discharge request across the energy storage systems; and limiting the charge and/or discharge of one or more energy storage systems to a submaximal value.

In another aspect, the present disclosure provides for a method of allocating power across a microgrid having a plurality of energy storage systems with different power and/or energy capacities, and different states of charge. The method includes allocating a total charge request and/or a total discharge request across the energy storage systems; and limiting the charge and/or discharge of each of the plurality of energy storage systems to a submaximal value for a limited window. The submaximal value is a function of the total desired charge or discharge request, and the limited window is the same for each of the plurality of the energy storage systems.

In yet another aspect, the present disclosure provides for a microgrid system including a plurality of energy storage systems having different power and/or energy capacities, and different states of charge; and a microgrid controller communicatively coupled to each energy storage system for sending information to, and receiving information from, each energy storage system. The microgrid controller is configured to: allocate a total charge request and/or a total discharge request across the energy storage systems; and limit the charge and/or discharge of one or more energy storage systems to a submaximal value.

DETAILED DESCRIPTION

Both the foregoing general description and the following detailed description are exemplary and explanatory only and are not restrictive of the features, as claimed. The same reference numbers in different alternatives are used to describe the same components or functions. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value or characteristic.

Figure 1:
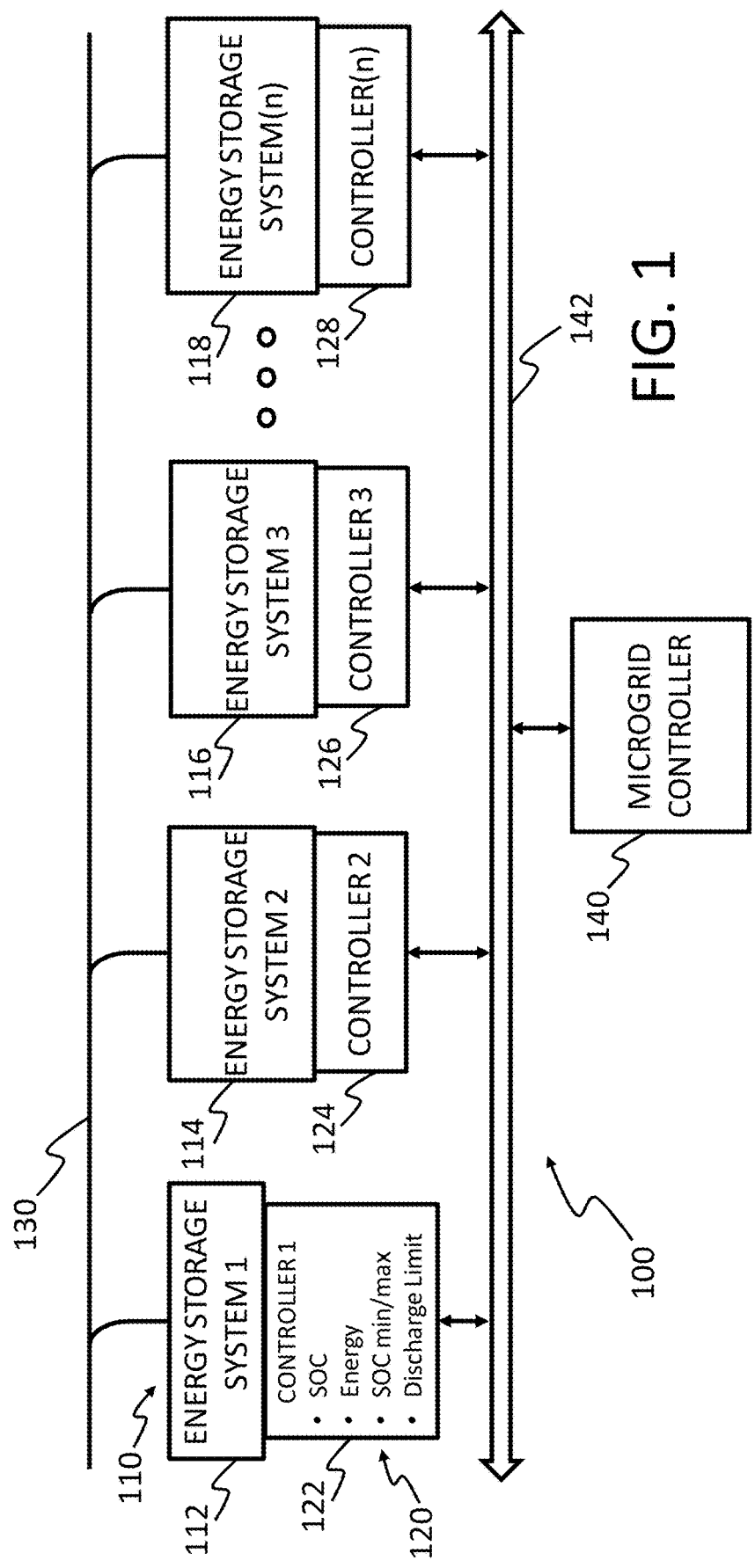
FIG. 1 illustrates an exemplary microgrid according to the present disclosure.

FIG. 1 illustrates a microgrid 100 including a plurality of energy storage systems ("ESS") 110. Each ESS 110 may include a local controller 120, and each ESS 110 may be coupled to a power bus 130 for receiving and discharging charge. Microgrid 100 may also include a microgrid controller 140 communicatively coupled the local controller 120 of each ESS 110 across a communication bus 142.

Any number of energy storage systems 110 could be included in microgrid 100. For example, as shown in FIG. 1, microgrid 100 may include a first energy storage system, ESS1 112, a second energy storage system, ESS2 114, a third energy storage system, ESS3 116, and an n-number energy storage system ESS(n) 118. Each ESS 110 may have a different configuration and be rated for a different power and energy capacity, as well as having a different state of charge ("SOC"). ESSs 112, 114, 116, 118 may include one or more batteries, fuel cells, supercapacitors, and/or any other type of energy storage source. In addition to a local controller 120, each ESS 110 may include any appropriate power electronics, such as switches, converters, and/or inverters to provide an appropriate interface between the ESS 110 and the power bus 130 and communication bus 142.

Referring still to FIG. 1, the local controllers 120 may include controller1 122 associated with the ESS1 112, Controller2 124 associated with ESS2 114, Controller3 126 associated with ESS3 116, and Controller(n) 128 associated with ESS(n) 118. Each local controller 120 may include any appropriate hardware, software, firmware, etc. to sense and control ESS 110, and send information to, and receive information from, microgrid controller 140. For example, local controller 120 may be configured to sense, determine, and/or store various characteristics of its respective energy storage system 110. Such characteristics of ESS 110 may include, among others, the current SOC, the current energy, the SOC minimum threshold, the SOC maximum threshold, and the discharge limit of ESS 110. These characteristics of ESS 110 may be sensed, determined, and/or stored in any conventional manner. While local controller 120 is described as a single controller, it is understood that controller 120 may include multiple controllers such that the functions associated with local controller 120 may be distributed among more than one controller.

Microgrid controller 140 may include any appropriate hardware, software, firmware, etc. to sense, determine, and/or store various aspect of microgrid 100, and control various aspects of microgrid 100. Microgrid controller 140 may also send information to, and receive information from, each of the plurality of energy storage systems 112, 114, 116, 118 via respective ESS local controllers 122, 124, 126, 128. For example, microgrid controller 140 may receive or determine the need for charging or discharging of power from the microgrid 100, and may be configured to determine and send signals to allocate a total charge request and/or total discharge request across each of the plurality of energy storage systems 110.

As will be discussed in more detail below, when performing the power allocation functions, microgrid controller 140 may allocate a total charge request and/or a total discharge request across the energy storage systems as a function of a usable energy capacity of each energy storage system 110. The usable energy capacity corresponds to the capacity or amount of energy an energy storage system can receive in response to a total charging request (usable charge energy), or the capacity or amount of energy an energy storage system can discharge in response to a total discharge request (usable discharge energy). The usable charge energy is a function of a maximum state of charge, current state of charge, and current energy of the energy storage system, and the usable discharge energy is a function of a minimum state of charge, current state of charge, and current energy of the energy storage system. Microgrid controller 140 may determine a usable charge/discharge capacity of each ESS 110, a desired charge/discharge of each ESS 110, and a remainder power. While microgrid controller 140 is described as a single controller, it is understood microgrid controller 140 may include multiple controllers such that the functions discussed herein of microgrid controller 140 may be distributed among more than one controller.

Microgrid controller 140 may send and receive information in any appropriate manner, using appropriate hardware, software, firmware, etc. and via wired and/or wireless systems. For example, as noted above, microgrid controller 140 may send and receive information to and from local controllers 120 of each ESS 110 via communication bus 142.

Figure 2:
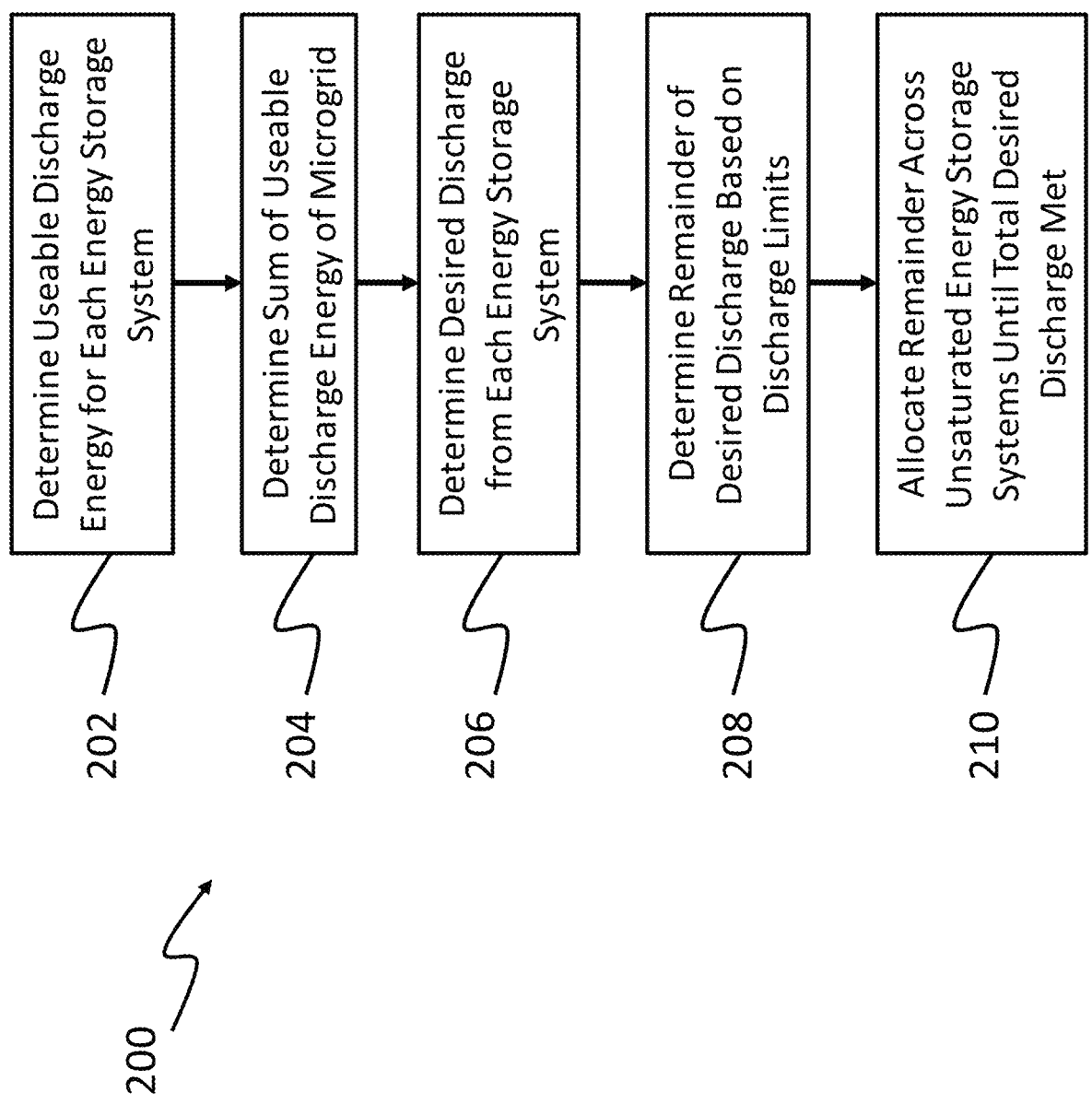
FIG. 2 provides a method for discharge power allocation across the microgrid of FIG. 1.

FIG. 2 provides a method 200 for discharge power allocation across microgrid 100. Thus, method 200 may correspond to a supervisory or other request or instruction received at microgrid controller 140 to discharge a total desired discharge of power from the energy storage systems 110 of microgrid 100 to power bus 130. Method 200 may include: determining a useable discharge energy for each energy storage system 110 (step 202), determining a sum of useable discharge energy of microgrid 100 (step 204), determining a desired discharge from each energy storage system 110 (step 206), determining a remainder of desired discharge based on discharge limits (step 208), and allocating the remainder across unsaturated energy storage systems 110 until the total desired discharge is met (step 210). The discharge power allocation method of FIG. 2 may be performed within microgrid controller 140 such that microgrid controller sends a discharge request to each ESS 110, or one or more aspects of method 200 may be performed by other controllers or systems, such as local controllers 120.

The determination of useable discharge energy for each energy storage system 110 (step 202) may include reading the current energy from each ESS 110, determining the energy content of ESS 110 at an SOC minimum threshold, and determining a usable discharge energy of the ESS 110 as the difference between the current energy and energy at the minimum SOC threshold. As provided in the Equation 1 below, the energy content of ESS 110 at SOC minimum threshold may be determined as an extrapolation from the current SOC of ESS 110 and the SOC minimum threshold. In this equation, and the equations that follow, ESS(i) refers to ESS1 through ESS(n).

Usable Discharge Energy of ESS(i)=Current Energy of ESS(i)−(Current Energy of ESS(i)*(SOC min of ESS(i)/current SOC of ESS(i)))  [Equation 1]

In Step 204 of method 200, the determined usable discharge energy of each ESS (112, 114, 116, 118) determined in accordance with Equation 1 is summed to provide a total usable energy of the microgrid 100.

Usable Discharge Energy Total=Sum(Usable Discharge Energy of ESS(i))  [Equation 2]

In Step 206 a desired discharge is determined for each energy storage system 110. This can be determined by multiplying the total desired discharge of the microgrid 100 by the ratio of the Usable Discharge Energy (Equation 1) of an individual energy storage system 110 to the Usable Discharge Energy Total (Equation 2).

Desired Discharge ESS(i)=Total Desired Discharge* (Usable Discharge Energy ESS(i)/Usable Discharge Energy Total)  [Equation 3]

When the method 200 moves to step 208—determining a remainder of desired discharge based on discharge limits—the microgrid controller 140 makes sure that the desired discharge of an ESS 110 does not exceed the discharge limit of the ESS 110. If the desired discharge for an ESS 110 would exceed the discharge limit for the ESS 110, microgrid controller establishes a remainder corresponding to the difference between the desired discharge and discharge limit for the ESS 110. See Equation 4 below. As provided in Equation 5 below, the remainders for each of the ESS 110 are then summed to find a reminder total.

If Desired Discharge of ESS(i)>Discharge Limit of ESS(i) then:

Desired Discharge ESS($i$)=Discharge Limit of ESS($i$) and

Remainder of ESS($i$)=(Desired Discharge ESS($i$)−Discharge Limit($i$))

If Desired Discharge of ESS($i$)≤Discharge Limit of ESS($i$) then:

Desired Discharge ESS($i$)=Desired Discharge ESS($i$) and

Remainder of ESS($i$)=0 [Equation 4]

Total Remainder=Sum(Remainder of ESS($i$)) [Equation 5]

Step 210 of FIG. 2 includes the microgrid controller 140 distributing or allocating the total remainder to any ESS 110 that is not saturated—any ESS 110 that has not reached its discharge limit. The total remainder may then be allocated by determining a remaining desired discharge using a ratio of the remaining unsaturated ESS's 110 individual usable discharge energy to the usable discharged energy of all of the unsaturated ESSs. And this process is repeated until the remainder is zero. Thus, steps 206-210 determine the commands sent to each ESS 110 from the microgrid controller 140, and these commands are sent during these steps until the total desired discharge is met. The discharge request for each ESS includes the desired discharge plus any remaining desired discharge. This step 210 of method 200 may be further explained with the following equations.

For any ESS($i$) where the Desired Discharge<Discharge Limit: Remaining Desired Discharge=Total Remainder*(Usable Discharge Energy($i$)/Usable Discharged Energy Total) [Equation 6]

Desired Discharge($i$)=Desired Discharge($i$)+Remaining Desired Discharge($i$) [Equation 7]

Figure 3:
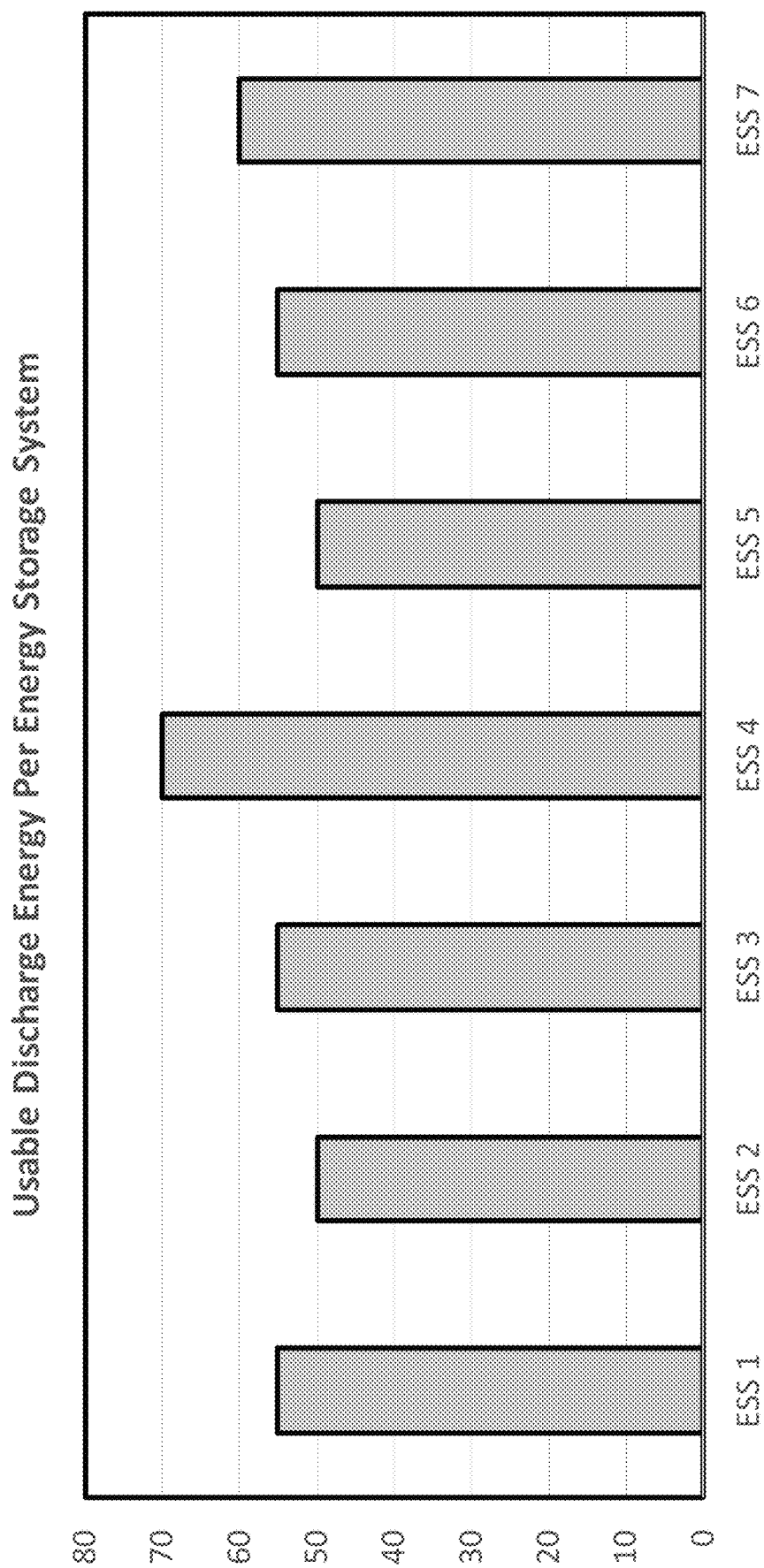
FIG. 3 illustrates an exemplary bar chart of usable discharge energy of energy storage systems of the microgrid of FIG. 1.
Figure 4:
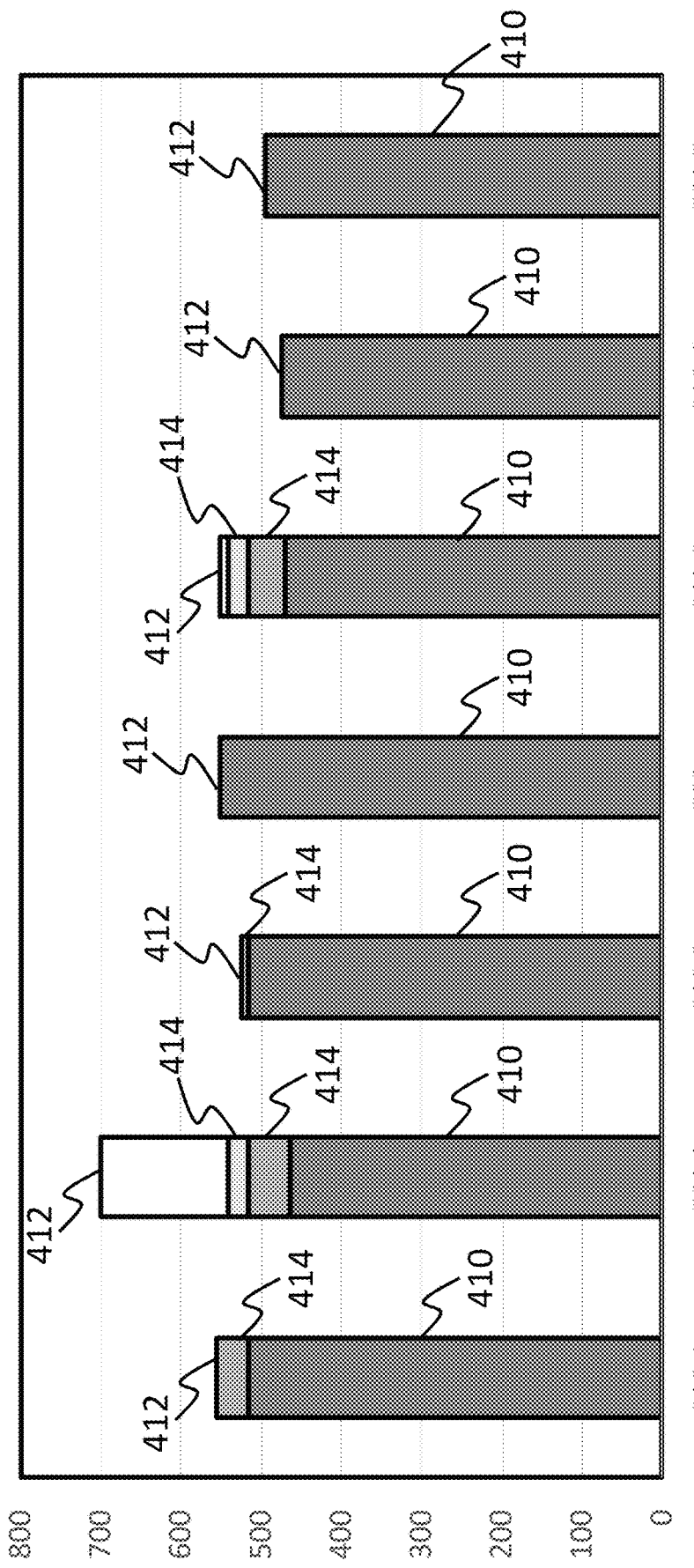
FIG. 4 illustrates an exemplary bar chart of iterative power increase per energy storage system of the microgrid of FIG. 1.
Figure 5:
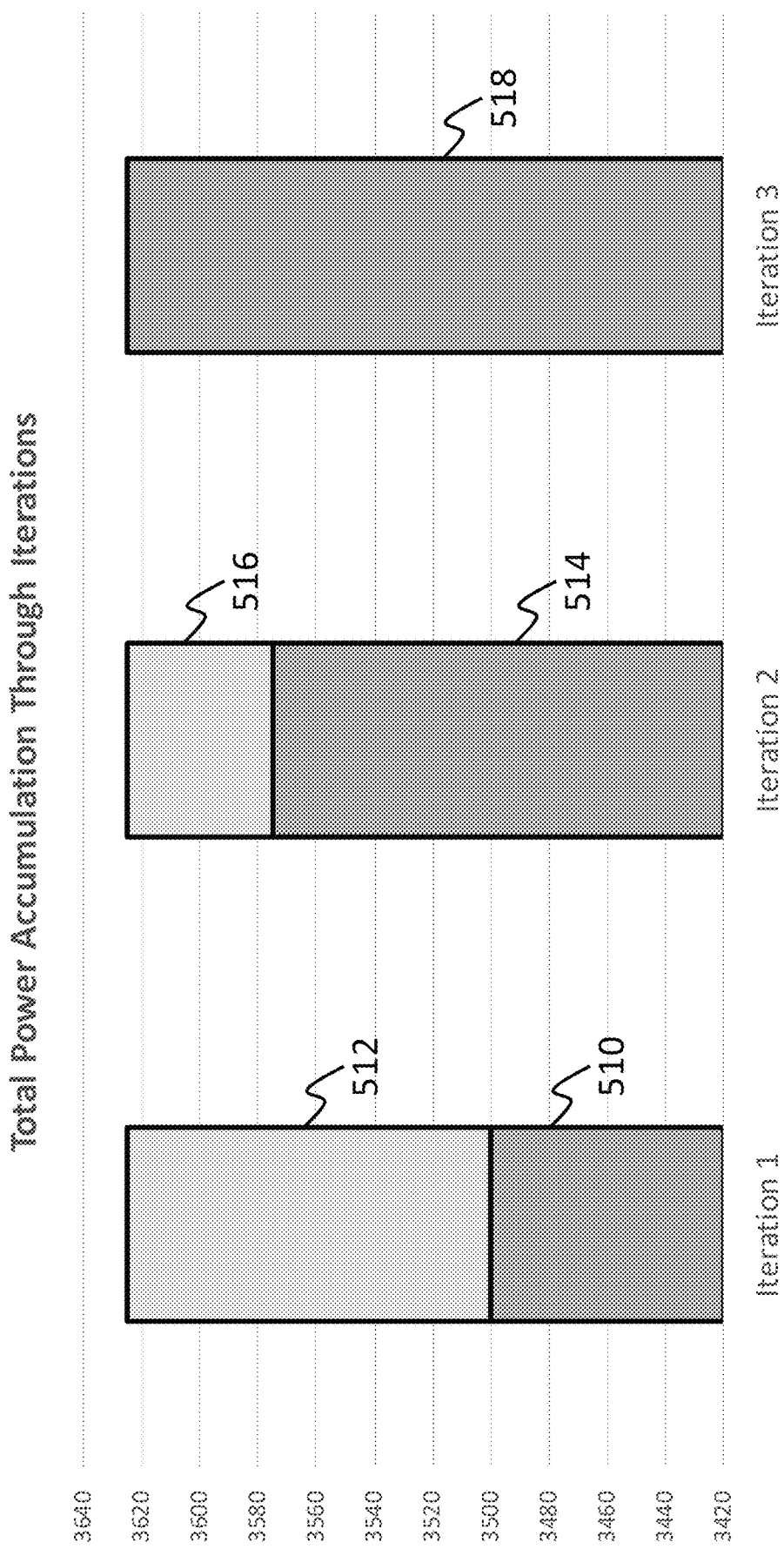
FIG. 5 illustrates an exemplary bar chart of total power accumulation through iterations for the microgrid of FIG. 1.

The discharge power allocation method 200 of FIG. 2 may be further explained with reference to the bar charts of FIGS. 3-5. In the charts of FIGS. 3-5, seven energy storage systems 110 are used, with different discharge limits and usable discharge energy. FIG. 3 provides a chart where the bars represent the usable discharge energy for each ESS 110 in accordance with Equation 1 above. As shown in the chart, ESS 4 has the most usable discharge energy, and ESS2 and ESS5 have the least usable discharge energy.

While FIG. 3 shows usable discharge energy (e.g., kWh), FIG. 4 shows power allocation across each ESS 110 (e.g., kW). The power allocation is determined in accordance with Equations 3-7 above. In particular, each bar in FIG. 4 includes a first iteration desired discharge 410 corresponding to the desired discharge of the ESS in a first iteration of allocating the total desired discharge. As provided by Equation 3 above, the first iteration desired discharge 410 of ESS4 is larger than that of ESS2 and ESS5, indicating that ESS4 receives a greater power allocation in the first iteration than ESS2 and ESS5 because ESS 4 has a larger usable discharge energy.

First iteration desired discharge 410 of ESS4, ESS6, and ESS7 extend the entire height of the bar, indicating that the desired discharge of the first iteration is greater than or equal to the discharge limit 412 of ESS4, ESS6, and ESS7 in accordance with Equation 4 above. Thus, these energy storage systems 110 may provide a remainder and the sum of these remainders corresponds to the total remainder of Equation 6 above. The first iteration desired discharge 410 of ESS1, ESS2, ESS3, and ESS5 is less than their respective discharge limits 412, and thus the total remainder may be allocated in accordance with Equation 6 to these energy storage systems 110. These energy storage systems will have second iteration remaining desired discharges 414, with those of ESS1 and ESS3 meeting or exceeding their respective discharge limits. ESS1 and ESS3 may thus provide another remainder to be allocated in accordance with Equation 6 to ESS2 and ESS5. These energy storage systems will have third iteration remaining desired discharges 416. Since these allocations do not meet the discharge limits for ESS2 or ESS5, then there is no remainder and the third iteration has allocated the total desired discharge. At this point, the discharge request sent from microgrid controller 140 to the local controllers 120 of each ESS 110 can be determined in accordance with Equation 7.

The bar chart of FIG. 5 shows the total power accumulation across the three iterations. As shown, the first iteration provides for a desired discharge 510 and a total remainder 512, and the second iteration provides for a greater desired discharge 514 and smaller remainder 516. Iteration 3 includes a desired discharge 518 equal to the total desired discharge, and thus has no remainder.

Figure 6:
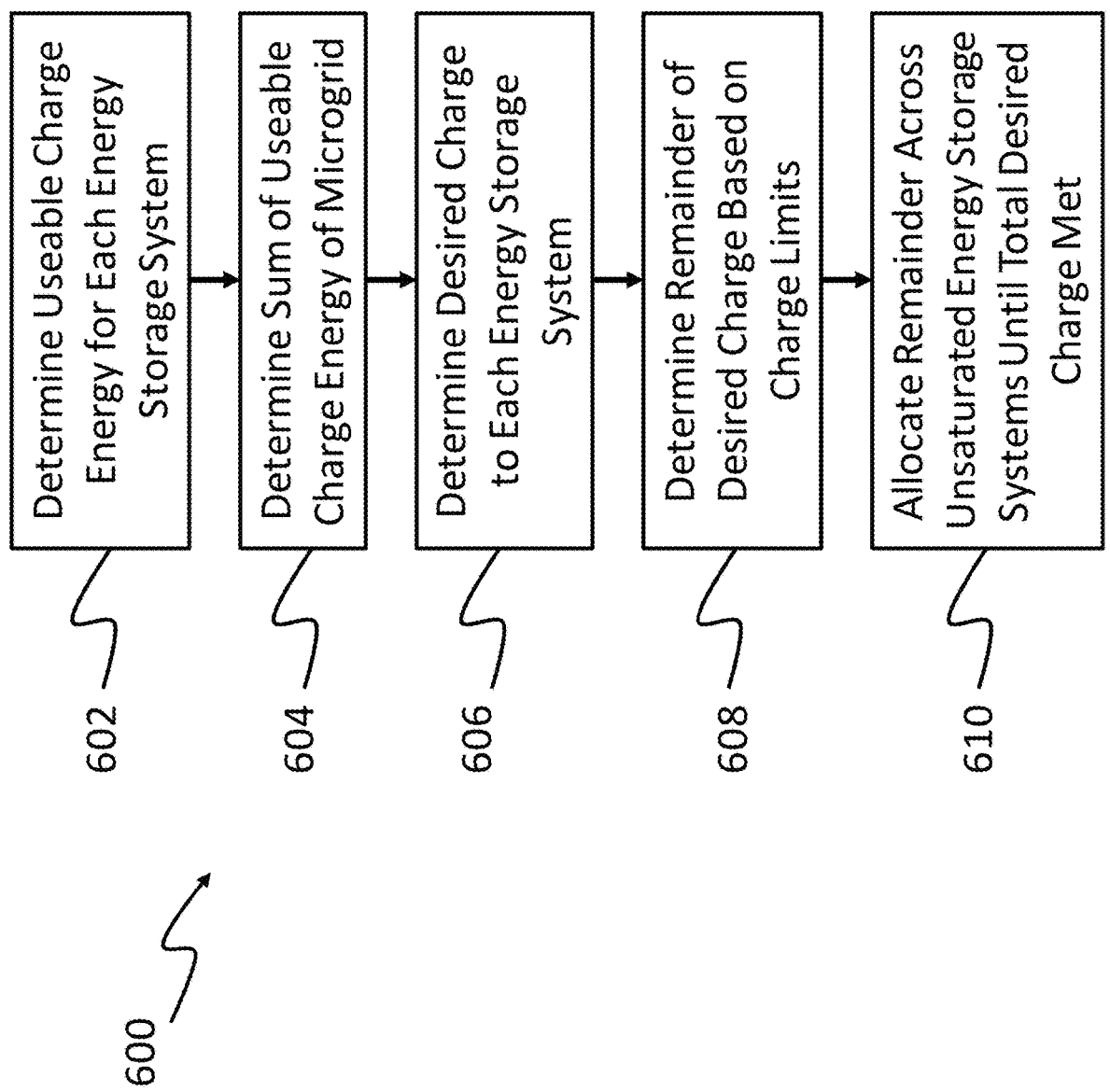
FIG. 6 provides a method for charge power allocation across the microgrid of FIG. 1.

The previous discussion of FIGS. 2-5 addressed discharge power allocation. When microgrid controller 140 receives a total charge request, the request may be allocated to each ESS 110 in a manner similar to that described above for discharge power allocation. FIG. 6 provides a method 600 for charge power allocation across microgrid 100. Method 600 may correspond to a supervisory request received at microgrid controller 140 to charge a total desired charge of power to the energy storage systems 110 of microgrid 100 from power bus 130. Method 600 may include: determining a useable charge energy for each energy storage system 110 (step 602), determining a sum of useable charge energy of microgrid 100 (step 604), determining a desired charge to each energy storage system 110 (step 606), determining a remainder of desired charge based on charge limits (step 608), and allocating the remainder across unsaturated energy storage systems 110 until the total desired charge is met (step 610). The charge power allocation method of FIG. 6 may be performed within microgrid controller 140 such that microgrid controller sends a charge request to each ESS 110, or one or more aspects of method 600 may be performed by other controllers or systems, such as local controllers 120.

The determination of useable charge energy for each energy storage system 110 (step 602) during charge power allocation may include reading the current energy from each ESS 110, determining the energy content of ESS 110 at an SOC maximum threshold, and determining a usable energy of the ESS 110 as the difference between the current energy and energy at the maximum threshold. As provide in the equation below, the energy content of ESS 110 at SOC maximum threshold may be determined as an extrapolation from the current SOC of ESS 110 and the SOC maximum threshold. In this equation, and the equations that follow, ESS($i$) refers to ESS1 through ESS($n$).

Usable Charge Energy of ESS($i$)=Current Energy of ESS($i$)−(Current Energy of ESS($i$)*(SOC max of ESS($i$)/SOC of ESS($i$))) [Equation 8]

In Step 604 of method 600, the usable charge energy of each ESS 112, 114, 116, 118 is summed to provide a total usable charge energy of the microgrid 100.

Usable Charge Energy Total=Sum(Usable Charge Energy of ESS($i$)) [Equation 9]

In Step 606 a desired charge is determined for each energy storage system 110. This can include multiplying the total desired charge of the microgrid 100 by the ratio of the usable charge of an individual energy storage system 110 to the total usable charge energy.

Desired Charge ESS(i)=Total Desired Charge*(Usable Charge Energy ESS(i)/Usable Charge Energy Total) [Equation 10]

When the method 600 moves to step 608—determining a remainder of desired charge based on charge limits—the microgrid controller 140 makes sure that the desired charge of an ESS 110 does not exceed the charge limit of the ESS 110. If the desired charge for an ESS 110 exceeds the charge limit for the ESS 110, microgrid controller establishes a remainder corresponding to the difference between the desired charge and charge limit for the ESS 110. The remainders for each of the ESS 110 are then summed to find a reminder total.

If Desired Charge of ESS(i)>Charge Limit of ESS(i) then:

Desired Charge ESS(i)=Charge Limit of ESS(i) and

Remainder of ESS(i)=(Desired Charge ESS(i)−Charge Limit(i))

If Desired Charge of ESS(i)≤Charge Limit of ESS(i) then:

Desired Charge ESS(i)=Desired Charge ESS(i) and

Remainder of ESS(i)=0 [Equation 11]

Total Remainder=Sum(ESS(i)) [Equation 12]

Step 610 of FIG. 6 includes the microgrid controller 140 distributing or allocating the total remainder to any ESS 110 that is not saturated—any ESS 110 that has not reached its charge limit. The total remainder may then be allocated by determining a remaining desired charge using a ratio of the remaining unsaturated ESS's 110 individual usable charge energy to the usable charged energy of all of the unsaturated ESSs 110. And this process is repeated until the remainder is zero. Thus, steps 606-610 determine the commands sent to each ESS 110 from the microgrid controller 140, and these commands are sent during these steps until the total desired charge is met. The charge request for each ESS includes the desired charge plus any remaining desired charge. This step 210 of method 200 may be further explained with the following equations.

For any ESS(i) where the Desired Charge<Charge Limit: Remaining Desired Charge=Total Remainder*(Usable Charge Energy(i)/Usable Charged Energy Total) [Equation 13]

Desired Charge(i)=Desired Charge(i)+Remaining Desired Charge(i) [Equation 14]

Figure 7:
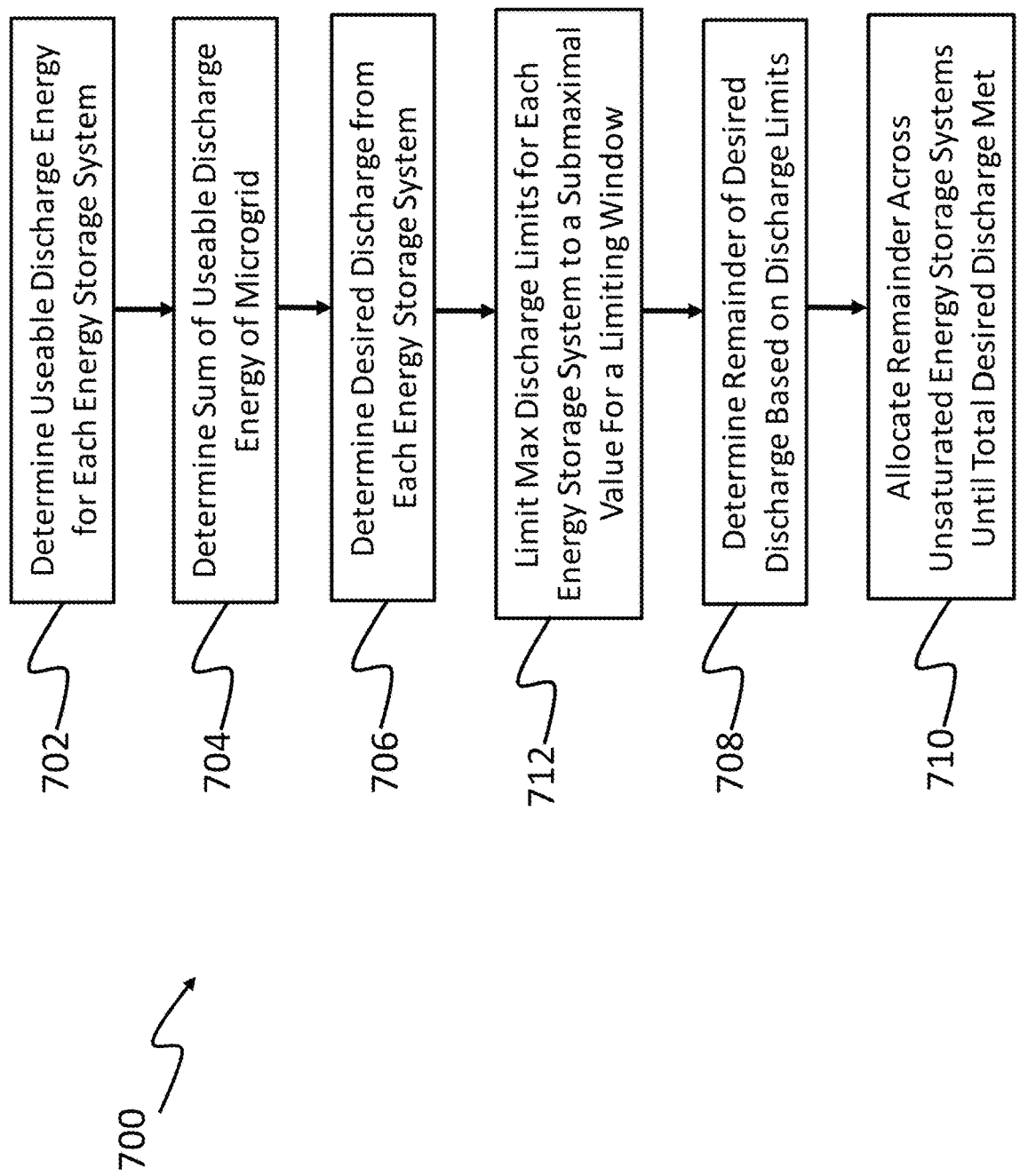
FIG. 7 provides a method for discharge power allocation across the microgrid of FIG. 1 with submaximal discharge.

In another aspect of the present disclosure shown in FIG. 7, the method of discharge or charge allocation 200, 600 (FIG. 2, FIG. 6) may include the same steps 702, 704, 706, 708, 710 as method 200 (and 600 in a charging process), and may include the additional step 712 of limiting the maximum discharge limits (or charge limits) for one or more energy storage systems 110 to a submaximal value for a limiting window, after which the discharge limit will increase linearly to their respective maximum value to meet the desired total discharge/charge request.

Figure 8:
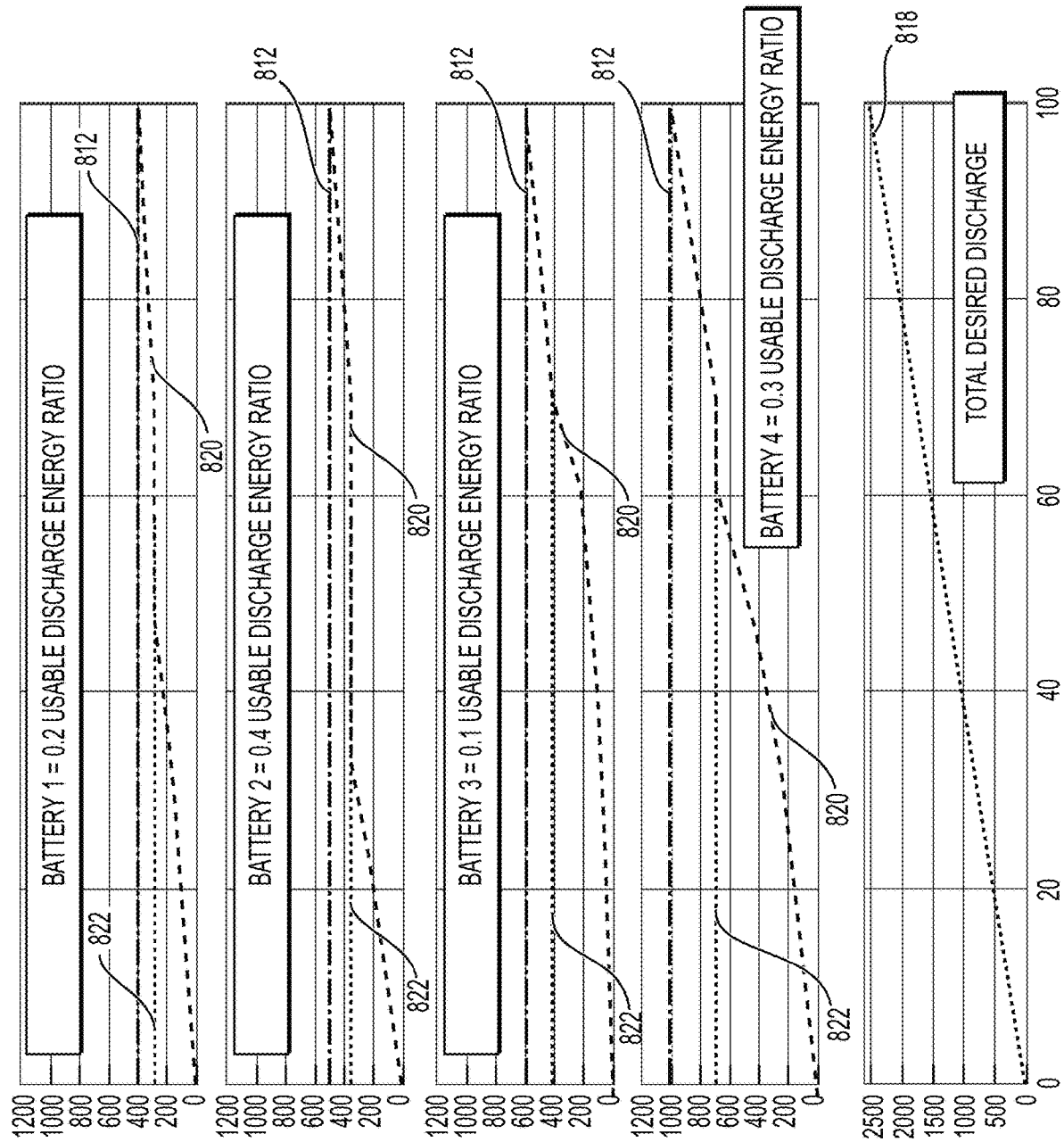
FIG. 8 provides charts of the discharge of four energy storage systems, in accordance with the method of FIG. 7

This method step 712 of FIG. 7 can be further explained with reference to FIG. 8 and an exemplary microgrid 100 having four online energy storage systems 110, e.g, batteries 1-4. In this example, a total desired discharge (2500 Kw) is received by, or determined in, microgrid controller 140 as discussed above. Each ESS of FIG. 8 has a different discharge limit, as shown by the horizontal lines 812 identified for each ESS 110, and these discharge limits 812 sum to the total desired discharge (2500 Kw). The discharge 820 of each of the ESSs 110 may be limited to a submaximal discharge limit in accordance with Equation 15 below. The submaximal discharge limit values are identified with horizontal lines 822 for each ESS 110 in FIG. 8, with the submaximal value being the discharge limit of an ESS 110 multiplied by a convergence factor.

Submaximal Discharge Limit(i)=Discharge Limit(i)*Convergence Factor [Equation 15]

The convergence factor may be a constant value, such as (0.7 or 70%), and may be stored or otherwise determined and applied by microgrid controller 140. As shown in FIG. 8, each ESS is discharged to its respective submaximal value until all of the ESSs 110 reach their submaximal discharge limits. As shown in FIG. 8, Battery 2 reaches its submaximal discharge limit 822 first, at approximately 30% of the total desired discharge. Battery 1 then meets its submaximal discharge limit 822 (at approximately 45% of the total desired discharge), followed by Battery 4 at approximately 60% of the total desired discharge, and finally Battery 3 reaches its submaximal discharge limit 822 at approximately 70% of the total desired discharge. As shown by the horizontal portion of discharge 820 for each ESS 110, Batteries 1, 2, and 4 wait for Battery 3 to reach its submaximal discharge limit 822. This period where all of the ESSs 110 are being discharged to their submaximal discharge limit 822 (and waiting for the last of the ESSs to reach its submaximal discharge limit 822) corresponds to the limiting window of the ESSs 110 in accordance with step 712 of FIG. 7. After this limiting window, all of the ESSs are discharged linearly to their discharge limit 812 to meet the total desired discharge (2500 Kw). This is shown by the linear increase of each discharge 820 from approximately 70% of the total desired discharge to the total desired discharge (100%).

By using the submaximal discharge limit (step 712), the microgrid 100 may avoid maximum discharging (or charging) of each energy storage system 110 for the limiting window. For example, using the submaximal discharge limit 822 may allow one ESS to use more of its discharge limit (812), while allowing other energy storage systems having a lower discharge limit 812 to back off of their discharge limits 812, with none of the ESSs 110 reaching max discharge limit (or charge limit) during the limiting window. Thus, such a system may help those energy storage systems 110 having a lower discharge limit from running at maximum discharge/charge during the entire discharge/charge process.

INDUSTRIAL APPLICABILITY

The disclosed methods and systems for charging and/or discharging energy storage systems may be used in any microgrid-type system that sends and receives power.

The methods and systems disclosed herein may provide a balancing of state of charge (SOC) and power distribution across energy storage systems 110 of a microgrid 100 when the energy storage systems 110 of the microgrid 100 have different power and/or energy capacities and different states of charge. The method and systems allow for microgrid controller 140 to provide asymmetric charge or discharge requests as a function of usable capacity of each energy storage system 110. With this, the systems and methods disclosed herein may allow the SOC of each energy storage system 110 to eventually converge when the rated capacities of energy storage systems are different. Providing such a balancing of the SOC of the energy storage systems 110 may extend the health and life of the systems, and thus may extend the health and life of the microgrid 100.

Further, as noted above, performing the step 712 of the method of FIG. 7 may limit the amount of time an ESS 110 is running at maximum discharge/charge. Limiting the running of the energy storage systems 110 at maximum power may extend the health and life of the systems, and may provide for a more stable microgrid 100.

It will be apparent to those skilled in the art that various modifications and variations can be made to the disclosed machine without departing from the scope of the disclosure. Other embodiments of the machine will be apparent to those skilled in the art from consideration of the specification and practice of the system and methods described herein. For example, the above described process steps need not be performed in the order described, but rather certain steps can be performed in a different order and/or can be performed simultaneously with other steps. Further, it is understood that one or more of the energy storage systems 110 of microgrid 100 may be excluded or offline from the charge or discharge allocations provided above. It is intended that the specification and examples be considered as exemplary only, with a true scope of the disclosure being indicated by the following claims and their equivalents.

What is claimed is:

1. A method of allocating power across a microgrid having a plurality of energy storage systems with different power and/or energy capacities, and different states of charge; the method comprising:
    allocating a total charge request and/or a total discharge request across the plurality of energy storage systems;
    limiting charge and/or discharge of the plurality of energy storage systems to a respective submaximal value for each of the plurality of energy storage systems, wherein the submaximal value for each of the plurality of energy storage systems is a function of the total charge and/or discharge limit of the respective one of the plurality of energy storage systems and a convergence factor; and
    allocating a remainder of the total charge request and/or a remainder of the total discharge request to a subset of the plurality of energy storage systems, the subset comprising one or more of the plurality of energy storage systems that have not reached their respective submaximal value,
    wherein the total charge and/or the total discharge request corresponds to a sum of the charge and/or discharge limits, respectively, of each of the plurality of energy storage systems,
    wherein the limiting to the submaximal values occurs for a limited window,
    wherein the limited window ends when all of the energy storage units have reached their said respective submaximal values, and
    wherein, after the limiting window, the charge and/or discharge is increased linearly to a charge limit and/or discharge limit.

2. The method of allocating power according to claim 1, wherein the submaximal value corresponds to a charge limit or discharge limit of an energy storage system multiplied by a percentage value of the total charge request or the total discharge request.

3. The method of allocating power according to claim 1, wherein each of the plurality of energy storage systems includes a fuel cell system.

4. The method of allocating power according to claim 1, wherein the microgrid allocates both the total charge request and the total discharge request.

5. The method of allocating power according to claim 1, wherein each of the plurality of energy storage systems includes a battery system.

6. The method of allocating power according to claim 1, where the limited window corresponds to a convergence value applied to each of the plurality of energy storage systems.

7. The method of allocating power according to claim 6, wherein the convergence value is a stored value in a controller of the microgrid, and is the same for each of the plurality of energy storage systems.

8. A method of allocating power across a microgrid having a plurality of energy storage systems with different power and/or energy capacities, and different states of charge; the method comprising:
    allocating a total charge request and/or a total discharge request across the energy storage systems;
    limiting charge and/or discharge of each of the plurality of energy storage systems to a submaximal value for a window, wherein the submaximal value is a function of the total charge request or the total discharge request and a convergence factor; and
    linearly increasing the charge and/or discharge of each of the plurality of energy storage systems after the window, and wherein the window ends when all of the energy storage systems have reached their said respective submaximal values.

9. The method of allocating power according to claim 8, wherein, after the window, the charge and/or discharge is increased linearly to a charge limit and/or discharge limit.

10. The method of allocating power according to claim 8, wherein the submaximal value of each of the plurality of energy storage systems corresponds to the charge or discharge limit of the respective energy storage system multiplied by a percentage value of the total charge request or the total discharge request.

11. The method of allocating power according to claim 8, wherein the limiting of the charge or discharge is applied to each of the plurality of energy storage systems.

12. The method of allocating power according to claim 8, wherein the plurality of energy storage systems include at least one of a battery system or a fuel cell system.

13. The method of allocating power according to claim 8, wherein the microgrid allocates both the total charge request and the total discharge request.

14. The method of allocating power according to claim 8, wherein the window ends upon reaching a convergence value.

15. The method of allocating power according to claim 14, wherein the convergence value is a stored value in a controller of the microgrid, and is the same for each of the plurality of energy storage systems.

16. A microgrid system, comprising:
    a plurality of energy storage systems having different power and/or energy capacities, and different states of charge; and
    a microgrid controller communicatively coupled to each energy storage system for sending information to, and receiving information from, each of the plurality of energy storage systems, the microgrid controller configured to:

allocate a total charge request and/or a total discharge request across the plurality of energy storage systems;

limit charge and/or discharge of the plurality of energy storage systems to a respective submaximal value for each of the plurality of energy storage systems, wherein the submaximal value for each of the plurality of energy storage systems is a function of the total charge and/or discharge limit of the respective one of the plurality of energy storage systems and a convergence factor; and allocate a remainder of the total charge request and/or a remainder of the total discharge request to a subset of the plurality of energy storage systems, the subset comprising one or more energy storage systems that have not reached their respective submaximal value, wherein the total charge and/or the total discharge request corresponds to a sum of the charge and/or discharge limits of each of the plurality of energy storage system, wherein the limiting to the submaximal values occurs for a limited window, wherein the limited window ends when all of the energy storage units have reached their said respective submaximal values, and increasing the charge and/or discharge of each of the plurality of energy storage systems after the limited window to the lesser of the total charge and/or discharge limit of each of the plurality of energy storage systems and the total charge request and/or discharge request of each of the plurality of energy storage systems.

17. The microgrid system of claim 16, wherein the submaximal value of each of the plurality of energy storage systems corresponds to a discharge limit of the respective energy storage system multiplied by a percentage value of the total charge request or the total discharge request.

* * * * *